(12) United States Patent
Kohzuki et al.

(10) Patent No.: US 9,815,993 B2
(45) Date of Patent: Nov. 14, 2017

(54) ACTIVE ENERGY RAY CURABLE COMPOSITION, INK, INKJET INK, METHOD FOR PRODUCING CURED PRODUCT, APPARATUS FOR PRODUCING CURED PRODUCT, COMPOSITION STORAGE CONTAINER, CURED PRODUCT, AND PROCESSED PRODUCT

(71) Applicants: Shizuka Kohzuki, Kanagawa (JP); Mie Yoshino, Kanagawa (JP); Manabu Arita, Kanagawa (JP); Hiroki Kobayashi, Kanagawa (JP)

(72) Inventors: Shizuka Kohzuki, Kanagawa (JP); Mie Yoshino, Kanagawa (JP); Manabu Arita, Kanagawa (JP); Hiroki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/233,455

(22) Filed: Aug. 10, 2016

(65) Prior Publication Data

US 2017/0058135 A1 Mar. 2, 2017

(30) Foreign Application Priority Data

Sep. 1, 2015 (JP) .................. 2015-172285

(51) Int. Cl.
*C09D 11/101* (2014.01)
*B41M 5/50* (2006.01)
(Continued)

(52) U.S. Cl.
CPC ............... *C09D 11/101* (2013.01); *B41J 2/01* (2013.01); *C09D 11/30* (2013.01); *C09D 11/322* (2013.01)

(58) Field of Classification Search
CPC ..... C09D 11/101; C09D 11/107; C09D 11/30; B41J 2/01; B41M 5/502
(Continued)

(56) References Cited

U.S. PATENT DOCUMENTS

2009/0171007 A1* 7/2009 Jonai .................... C09D 11/101
524/548
2012/0086762 A1 4/2012 Noguchi et al.
(Continued)

FOREIGN PATENT DOCUMENTS

JP  2013-022932        2/2013
JP  2015-083656 A1    4/2015
(Continued)

OTHER PUBLICATIONS

U.S. Appl. No. 14/837,423, filed Aug. 27, 2015.
U.S. Appl. No. 15/042,928, filed Feb. 12, 2016.

*Primary Examiner* — Stephen Meier
*Assistant Examiner* — Alexander D Shenderov
(74) *Attorney, Agent, or Firm* — Oblon, McClelland, Maier & Neustadt, L.L.P.

(57) ABSTRACT

An active energy ray curable composition including a polymerizable compound is provided. When a three-layer cured product of the active energy ray composition is obtained by a specific procedure, the three-layer cured product has (1) a stretchability of 1.1 or more and (2) a glass transition temperature of 50° C. or more. The stretchability is defined by a ratio L2/L1, wherein L1 represents a first length of the cured product before a tensile test and L2 represents a second length of the cured product after the tensile test. The tensile test includes stretching the cured product along with the substrate with a tensile tester at a stretching speed of 20 mm/min and a temperature of 180° C.

14 Claims, 2 Drawing Sheets

(51) Int. Cl.
*B41J 2/01* (2006.01)
*C09D 11/30* (2014.01)
*C09D 11/107* (2014.01)
*C09D 11/322* (2014.01)

(58) Field of Classification Search
USPC .......................................................... 347/102
See application file for complete search history.

(56) References Cited

U.S. PATENT DOCUMENTS

| | | |
|---|---|---|
| 2012/0147103 A1 | 6/2012 | Hasegawa et al. |
| 2012/0176456 A1 | 7/2012 | Maekawa et al. |
| 2012/0200648 A1 | 8/2012 | Hiraoka et al. |
| 2012/0242768 A1 | 9/2012 | Seno et al. |
| 2012/0293589 A1 | 11/2012 | Hiraoka |
| 2013/0002773 A1* | 1/2013 | Fujii .................... C09D 11/101 347/86 |
| 2013/0321539 A1 | 12/2013 | Hiraoka |
| 2014/0125744 A1 | 5/2014 | Hiraoka |
| 2014/0139596 A1 | 5/2014 | Hiraoka |
| 2014/0139597 A1 | 5/2014 | Hiraoka |
| 2014/0240414 A1 | 8/2014 | Hiraoka |
| 2014/0327719 A1 | 11/2014 | Hiraoka |
| 2014/0336298 A1 | 11/2014 | Hiraoka |
| 2014/0338562 A1 | 11/2014 | Hiraoka |
| 2015/0009265 A1 | 1/2015 | Kohzuki et al. |
| 2015/0042731 A1 | 2/2015 | Hiraoka |
| 2015/0077481 A1 | 3/2015 | Yoshino et al. |
| 2015/0091986 A1 | 4/2015 | Seno et al. |
| 2015/0099819 A1 | 4/2015 | Hiraoka |
| 2015/0126636 A1 | 5/2015 | Hiraoka |
| 2015/0130878 A1 | 5/2015 | Kohzuki et al. |
| 2015/0232675 A1 | 8/2015 | Yoshino et al. |
| 2015/0232676 A1 | 8/2015 | Hiraoka |
| 2015/0232677 A1 | 8/2015 | Hiraoka |
| 2015/0329729 A1 | 11/2015 | Hiraoka |
| 2016/0009931 A1 | 1/2016 | Kohzuki et al. |
| 2016/0075895 A1* | 3/2016 | Kohzuki ................ C09D 11/10 347/102 |
| 2016/0102216 A1 | 4/2016 | Hirade et al. |
| 2016/0326387 A1* | 11/2016 | Arita ...................... B33Y 70/00 |
| 2016/0347961 A1* | 12/2016 | Kobayashi ........... C09D 133/26 |
| 2017/0015850 A1* | 1/2017 | Yoshino ............... C09D 11/101 |

FOREIGN PATENT DOCUMENTS

| | | |
|---|---|---|
| JP | 2015-117359 | 6/2015 |
| WO | WO 2007/013368 A1 | 2/2007 |

* cited by examiner

ACTIVE ENERGY RAY CURABLE COMPOSITION, INK, INKJET INK, METHOD FOR PRODUCING CURED PRODUCT, APPARATUS FOR PRODUCING CURED PRODUCT, COMPOSITION STORAGE CONTAINER, CURED PRODUCT, AND PROCESSED PRODUCT

CROSS-REFERENCE TO RELATED APPLICATIONS

This patent application is based on and claims priority pursuant to 35 U.S.C. §119(a) to Japanese Patent Application No. 2015-172285, filed on Sep. 1, 2015, in the Japan Patent Office, the entire disclosure of which is hereby incorporated by reference herein.

BACKGROUND

Technical Field

The present disclosure relates to an active energy ray curable composition, an ink, an inkjet ink, a method for producing a cured product, an apparatus for producing a cured product, a composition storage container, a cured product, and a processed product.

Description of the Related Art

There is demand for active energy ray curable inks which are applicable to inkjet printing and are thermally stretchable and moldable, to be used for building materials and decorative printings.

A cured film of a conventional active energy ray curable inkjet ink generally has a high hardness. In a case in which an image is formed with such a conventional active energy ray curable inkjet ink on a substrate and the cured film of the image is subjected to a stretching processing, the cured film cannot be processed in a desired manner since the stretchability of the cured film is so poor that the cured film cannot follow a deformation of the substrate.

SUMMARY

In accordance with some embodiments of the present invention, an active energy ray curable composition is provided. The active energy ray curable composition includes a polymerizable compound. When a three-layer cured product of the active energy ray composition is obtained by: forming a first film of the active energy ray curable composition having an average thickness of 10 μm on a polycarbonate substrate having a thickness of 100 μm and irradiating the first film with an active energy ray having a light quantity of 1,500 mJ/cm$^2$; forming a second film of the active energy ray curable composition having an average thickness of 10 μm on the first film and irradiating the second film with an active energy ray having a light quantity of 1,500 mJ/cm$^2$; and forming a third film of the active energy ray curable composition having an average thickness of 10 μm on the second film and irradiating the third film with an active energy ray having a light quantity of 1,500 mJ/cm$^2$, the three-layer cured product has (1) a stretchability of 1.1 or more and (2) a glass transition temperature of 50° C. or more. The stretchability is defined by a ratio L2/L1, wherein L1 represents a first length of the cured product before a tensile test and L2 represents a second length of the cured product after the tensile test. The tensile test includes stretching the cured product along with the substrate with a tensile tester at a stretching speed of 20 mm/min and a temperature of 180° C.

In accordance with some embodiments of the present invention, an ink is provided. The ink includes the above active energy ray curable composition.

In accordance with some embodiments of the present invention, an inkjet ink is provided. The inkjet includes the above ink.

In accordance with some embodiments of the present invention, a method for producing a cured product is provided. The method includes the steps of discharging the above active energy ray curable composition to a surface of a substrate by inkjet recording, and emitting an active energy ray to the active energy ray curable composition on the surface of the substrate to cause the active energy ray curable composition to cure.

In accordance with some embodiments of the present invention, an apparatus for producing a cured product is provided. The apparatus includes a container, a discharger, and a hardener. The container contains the above active energy ray curable composition. The discharger discharges the active energy ray curable composition to a surface of a substrate by inkjet recording. The hardener emits an active energy ray to the active energy ray curable composition on the surface of the substrate to cause the active energy ray curable composition to cure.

In accordance with some embodiments of the present invention, a composition storage container is provided. The composition storage container includes a container and the above active energy ray curable composition contained in the container.

In accordance with some embodiments of the present invention, a cured product is provided. The cured product is produced by a method which includes the step of causing the above active energy ray curable composition to cure.

In accordance with some embodiments of the present invention, a processed product is provided. The processed product is produced by a method which includes the step of stretching-processing the above cured product.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
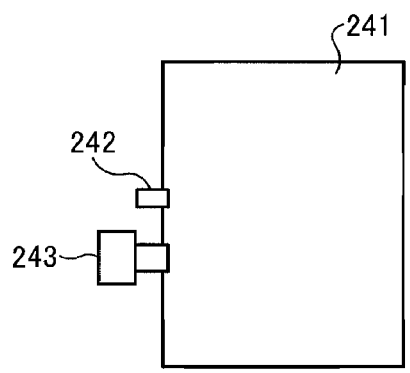
FIG. 1 is a schematic view of an ink bag according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In accordance with some embodiments of the present invention, an active energy ray curable composition is provided, which is capable of becoming a cured product having a good combination of stretchability and strength.

Active Energy Ray Curable Composition

The active energy ray curable composition according to an embodiment of the present invention includes at least a polymerizable compound. The active energy ray curable composition may optionally include other components, if necessary. The use application of the active energy ray curable composition is not limited, but is preferably used for inks, in particular, inkjet inks.

Stretchability

When a three-layer cured product of the active energy ray composition is obtained by: forming a first film of the active energy ray curable composition having an average thickness of 10 μm on a polycarbonate substrate having a thickness of 100 μm and irradiating the first film with an active energy ray having a light quantity of 1,500 mJ/cm$^2$; forming a second film of the active energy ray curable composition having an average thickness of 10 μm on the first film and irradiating the second film with an active energy ray having a light quantity of 1,500 mJ/cm$^2$; and forming a third film of the active energy ray curable composition having an average thickness of 10 μm on the second film and irradiating the third film with an active energy ray having a light quantity of 1,500 mJ/cm$^2$, the three-layer cured product has a stretchability of 1.1 or more, preferably, 1.5 or more. Here, the stretchability is defined by a ratio L2/L1, wherein L1 represents a first length of the cured product before a tensile test and L2 represents a second length of the cured product after the tensile test. In the tensile test, the cured product is stretched along with the substrate with a tensile tester at a stretching speed of 20 mm/min and a temperature of 180° C.

The polycarbonate substrate is a polycarbonate (PC) film (Iupilon® 100FE2000 Masking, having a thickness of 100 μm, available from Mitsubishi Engineering-Plastics Corporation).

Glass Transition Temperature and Storage Elastic Modulus of Cured Product

To measure the glass transition temperature and storage elastic modulus, the cured product on the polycarbonate substrate is cut into a piece having a width of 10 mm and a length of 40 mm, gently peeled off, and subjected to a measurement with a dynamic viscoelasticity measuring instrument DMS6100 (available from Seiko Instruments Inc.) while setting the distance between chucks to 20 mm, the measurement frequency to 1 Hz, the measurement temperature range to from 30° C. to 130° C., and the temperature rising rate to 1° C./min.

The glass transition temperature (Tg) is determined from a peak top temperature with respect to tan δ in the resulting profile. The storage elastic modulus (E') at 90° C. is read from the profile.

To make the cured product of the active energy ray curable composition achieve a good balance between strength and stretchability, the active energy ray curable composition preferably includes a balanced combination of a monofunctional reactive compound having a high Tg and another monofunctional reactive compound having a low Tg. More preferably, the amount of the monofunctional reactive compound having a high Tg accounts for half or more of the total monofunctional reactive compounds, to more improve the strength of the cured product.

When the cured product has a glass transition temperature of 50° C. or more, the cured product can maintain a glass state while improving the strength. The cured product preferably has a glass transition temperature of 80° or more, more preferably 100° C. or more. When the cured product has a storage elastic modulus of from 0.85 to 10 MPa at 90° C., the cured product provides improved elasticity and strength.

Glass Transition Temperature of Homopolymers

In the present disclosure, glass transition temperature (Tg) values of homopolymers are those disclosed in their monomer-manufacturer's catalogs, if any. Otherwise, Tg values of homopolymers were actually measured by means of differential scanning calorimetry (DSC) as follows.

Measurement of Glass Transition Temperature (Tg)

In a case in which the reactive compound is a monofunctional monomer, the homopolymer thereof is obtained a typical liquid polymerization as follows.

A toluene solution which contains 90 parts by mass of toluene, 10 parts by mass of a monofunctional monomer, and 0.5 parts by mass of azobis isobutyronitrile, serving as a polymerization initiator, is enclosed in a test tube under a nitrogen purge. The test tube is shaken in a hot bath having a temperature of 60° C. for 6 hours, to prepare a polymer. The polymer is then reprecipitated in a solvent in which the monofunctional monomer is soluble but the polymer is insoluble (e.g., methanol, petroleum ether), and isolated by filtration. The isolated polymer is subjected to a DSC measurement using an instrument DSC120U available from Seiko Instruments Inc. while setting the measurement temperature to in the range of from 30° C. to 300° C. and the temperature rising rate to 2.5° C./min.

The polymerizable compound preferably includes a reactive compound, the homopolymer of which having a Tg of 90° C. or more. More preferably, the polymerizable compound includes a monofunctional reactive compound, the homopolymer of which having a Tg of 90° C. or more, to provide more sufficient strength. Specific examples of such a reactive compound include, but are not limited to, hydroxyethyl acrylamide, hydroxyethyl methacrylamide, isobornyl acrylate, isobornyl methacrylate, adamantyl acrylate, adamantyl methacrylate, 2-methyl-2-adamantyl acrylate, 2-methyl-2-adamantyl methacrylate, acryloyl morpholine, methacryloyl morpholine, dimethylaminopropyl acrylamide, dicyclopentenyl acrylate, dicyclopentenyl methacrylate, dicyclopentanyl acrylate, dicyclopentanyl methacrylate, dicyclopentenyloxyethyl acrylate, dicyclopentenyloxyethyl methacrylate, 3,3,5-trimethylcyclohexane acrylate, and 3,3,5-trimethylcyclohexane methacrylate. Each of these compounds can be used alone or in combination with others. Among these compounds, those having a cyclic structure are preferable.

Specific examples of such reactive compounds having a cyclic structure include, but are not limited to, isobornyl acrylate and isobornyl methacrylate each having an isobornyl ring, and adamantyl acrylate and adamantyl methacrylate each having an adamantyl ring. When an ink includes such a reactive compound having a cyclic structure, a cured product of the ink provides sufficient strength and stiffness.

The polymerizable compound preferably includes at least one monofunctional reactive compound having one polymerizable ethylenic unsaturated double bond, and one of the monofunctional reactive compounds, the homopolymer of which having a glass transition temperature of 90° C. or more, accounts for 60% by mass or more of the total monofunctional reactive compounds. When the content rate is 60% by mass or more, the cured product provides improved storage elastic modulus, strength, and stretchability.

Monofunctional Reactive Compound

Specific examples of the monofunctional reactive compound include, but are not limited to, 2-hydroxyethyl acrylate, 2-hydroxypropyl acrylate, 4-hydroxybutyl acrylate, isobutyl acrylate, t-butyl acrylate, isooctyl acrylate, 2-methoxyethyl acrylate, methoxytriethylene glycol acrylate, 2-ethoxyethyl acrylate, 3-methoxybutyl acrylate, ethoxyethyl acrylate, butoxyethyl acrylate, ethoxydiethylene glycol acrylate, methoxydipropylene glycol acrylate, dipropylene glycol acrylate, β-carboxyethyl acrylate, ethyl diglycol acrylate, trimethylolpropane formal monoacrylate, imide acrylate, isoamyl acrylate, ethoxylated succinic acid acrylate, trifluoroethyl acrylate, ω-carboxypolycaprolactone monoacrylate, N-vinylformamide, cyclohexyl acrylate, tetrahydrofurfuryl acrylate, benzyl acrylate, methylphenoxyethyl acrylate, 4-t-butylcyclohexyl acrylate, caprolactone-modified tetrahydrofurfuryl acrylate, tribromophenyl acrylate, ethoxylated tribromophenyl acrylate, 2-phenoxyethyl acrylate (or ethylene oxide and/or propylene oxide adduct monomers thereof), acryloyl morpholine, isobornyl acrylate, phenoxydiethylene glycol acrylate, vinylcaprolactam, vinylpyrrolidone, 2-hydroxy-3-phenoxypropyl acrylate, and 1,4-cyclohexanedimethanol monoacrylate. Each type of these recording media can be used alone or in combination with others.

Polyfunctional Reactive Compound

The polymerizable compound may further include a polyfunctional reactive compound. Specific examples of the polyfunctional reactive compound include, but are not limited to, neopentyl glycol diacrylate, neopentyl glycol dimethacrylate, ethylene glycol diacrylate, ethylene glycol dimethacrylate, polyethylene glycol diacrylate, polyethylene glycol dimethacrylate, diethylene glycol diacrylate, diethylene glycol dimethacrylate, triethylene glycol diacrylate, triethylene glycol dimethacrylate, tetraethylene glycol acrylate, tetraethylene glycol dimethacrylate, polypropylene glycol diacrylate, polypropylene glycol dimethacrylate, tetramethylene glycol diacrylate, tetramethylene glycol dimethacrylate, polytetramethylene glycol diacrylate, polytetramethylene glycol dimethacrylate, propylene oxide (hereinafter "PO") adduct of bisphenol A diacrylate, PO adduct of bisphenol A dimethacrylate, ethoxylated neopentyl glycol diacrylate, ethoxylated neopentyl glycol dimethacrylate, propoxylated neopentyl glycol diacrylate, propoxylated neopentyl glycol dimethacrylate, ethylene oxide (hereinafter "EO") adduct of bisphenol A diacrylate, EO adduct of bisphenol A dimethacrylate, EO-modified pentaerythritol triacrylate, EO-modified pentaerythritol trimethacrylate, PO-modified pentaerythritol triacrylate, PO-modified pentaerythritol trimethacrylate, EO-modified pentaerythritol tetraacrylate, EO-modified pentaerythritol tetramethacrylate, PO-modified pentaerythritol tetraacrylate, PO-modified pentaerythritol tetramethacrylate, EO-modified dipentaerythritol tetraacrylate, EO-modified dipentaerythritol tetramethacrylate, PO-modified dipentaerythritol tetraacrylate, PO-modified dipentaerythritol tetramethacrylate, EO-modified trimethylolpropane triacrylate, EO-modified trimethylolpropane trimethacrylate, PO-modified trimethylolpropane triacrylate, PO-modified trimethylolpropane trimethacrylate, EO-modified tetramethylolmethane tetraacrylate, EO-modified tetramethylolmethane tetramethacrylate, PO-modified tetramethylolmethane tetraacrylate, PO-modified tetramethylolmethane tetramethacrylate, pentaerythritol triacrylate, pentaerythritol trimethacrylate, pentaerythritol tetraacrylate, pentaerythritol tetramethacrylate, dipentaerythritol tetraacrylate, dipentaerythritol tetramethacrylate, trimethylolpropane triacrylate, trimethylolpropane trimethacrylate, tetramethylolmethane tetraacrylate, tetramethylolmethane tetramethacrylate, trimethylolethane triacrylate, trimethylolethane trimethacrylate, trimethylolpropane triacrylate, trimethylolpropane trimethacrylate, bis(4-acryloxypolyethoxyphenyl)propane, bis(4-methacryloxypolyethoxyphenyl)propane, diallyl phthalate, triallyl trimellitate, 1,6-hexanediol diacrylate, 1,6-hexanediol dimethacrylate, 1,9-nonanediol diacrylate, 1,9-nonanediol dimethacrylate, 1,3-butylene glycol diacrylate, 1,3-butylene glycol dimethacrylate, 1,10-decanediol diacrylate, 1,10-decanediol dimethacrylate, hydroxypivalic acid neopentyl glycol diacrylate, hydroxypivalic acid neopentyl glycol dimethacrylate, tetramethylolmethane triacrylate, tetramethylolmethane trimethacrylate, dimethylol tricyclodecane diacrylate, dimethylol tricyclodecane dimethacrylate, modified glycerin triacrylate, modified glycerin trimethacrylate, bisphenol A glycidyl ether acrylic acid adduct, bisphenol A glycidyl ether methacrylic acid adduct, modified bisphenol A diacrylate, modified bisphenol A dimethacrylate, caprolactone-modified dipentaerythritol hexaacrylate, caprolactone-modified dipentaerythritol hexamethacrylate, dipentaerythritol hexaacrylate, dipentaerythritol hexamethacrylate, pentaerythritol triacrylate tolylene diisocyanate urethane polymer, pentaerythritol trimethacrylate tolylene diisocyanate urethane polymer, pentaerythritol triacrylate hexamethylene diisocyanate urethane polymer, pentaerythritol trimethacrylate hexamethylene diisocyanate urethane polymer, ditrimethylolpropane tetraacrylate, ditrimethylolpropane tetramethacrylate, pentaerythritol triacrylate hexamethylene diisocyanate urethane prepolymer, and pentaerythritol trimethacrylate hexamethylene diisocyanate urethane prepolymer. Each of these compounds can be used alone or in combination with others. Among these compounds, those having a functional group number of from 2 to 5 are preferable, and those having a functional group number of 2 are more preferable.

Preferably, the polymerizable compound includes a polyfunctional reactive compound having at least two polymerizable ethylenic unsaturated double bonds.

Specific examples of such a polyfunctional reactive compound include, but are not limited to, 1,3-butylene glycol diacrylate, 1,3-butylene glycol dimethacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, polyethylene glycol (200) diacrylate, polyethylene glycol (200) dimethacrylate, triethylene glycol diacrylate, triethylene glycol dimethacrylate, tripropylene glycol diacrylate, tripropylene glycol dimethacrylate, polyethylene glycol (400) diacrylate, polyethylene glycol (400) dimethacrylate, ethoxylated (3) bisphenol A diacrylate, ethoxylated (3) bisphenol A dimethacrylate, dipropylene glycol diacrylate, dipropylene glycol dimethacrylate, alkoxylated hexanediol diacrylate, alkoxylated hexanediol dimethacrylate, ethoxylated (4) bisphenol A diacrylate, ethoxylated (4) bisphenol A dimethacrylate, ethoxylated (10) bisphenol A diacrylate, ethoxylated (10) bisphenol A dimethacrylate, polyethylene glycol (600) diacrylate, polyethylene glycol (600) dimethacrylate, tricyclodecane dimethanol diacrylate, tricyclodecane dimethanol dimethacrylate, 1,9-nonanediol diacrylate, 1,9-nonanediol dimethacrylate, 1,10-decanediol diacrylate, 1,10-decanediol dimethacrylate, neopentyl glycol diacrylate, neopentyl glycol dimethacrylate, polytetramethylene glycol diacrylate, polytetramethylene glycol dimethacrylate, 3-methyl-1,5-pentanediol diacrylate, 3-methyl-1,5-pentanediol dimethacrylate, 1,9-nonanediol acrylate, 1,9-nonanediol methacrylate, methylol tricyclodecane diacrylate, methylol tricyclodecane dimethacrylate, CN9005, C9007, CN9009, CN9011, CN9018, CN9028, CN9178, CN9290, CN9783, CN9893, CN902, CN973, CN977, CN978, CN992, CN994, CN999, CN9167, CN9782, CN9783, and products of The Nippon Synthetic Chemical Industry Co., Ltd. such as UV-3000B, UV-3200B, UT-5454, UT-5449, UV-3300B, and UV-6640B. Each type of these recording media can be used alone or in combination with others.

Among these compounds, polyethylene glycol (200) diacrylate, polyethylene glycol (400) diacrylate, polyethylene glycol (600) diacrylate, 1,3-butylene glycol diacrylate, 1,4-butanediol diacrylate, 1,6-hexanediol diacrylate, 1,9-nonanediol diacrylate, 1,10-decanediol diacrylate, and neopentyl glycol diacrylate, each having a straight-chain structure, are preferable.

Polyethylene glycol (200) diacrylate, polyethylene glycol (400) diacrylate, and polyethylene glycol (600) diacrylate are represented by the following formulae.

Polyethylene glycol (200) diacrylate: $CH_2=CH-CO-(OC_2H_4)_n-OCOCH-CH_2n$ ($n \approx 4$)

Polyethylene glycol (400) diacrylate: $CH_2=CH-CO-(OC_2H_4)_n-OCOCH-CH_2n$ ($n \approx 9$)

Polyethylene glycol (600) diacrylate: $CH_2=CH-CO-(OC_2H_4)_n-OCOCH-CH_2n$ ($n \approx 14$)

Oligomer

The polyfunctional reactive compound may include an oligomer. Specific examples of polyfunctional oligomers include, but are not limited to, urethane oligomers. Urethane oligomers are commercially available. Specific examples of commercially-available urethane oligomers include, but are not limited to, UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (available from The Nippon Synthetic Chemical Industry Co., Ltd.); CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 (available from Tomoe Engineering Co., Ltd.); and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (available from DAICEL-ALLNEX LTD.). Each of these compounds can be used alone or in combination with others. Among these compounds, those having 2 to 5 polymerizable ethylenic unsaturated double bonds are preferable. To provide good punching processability, those having 2 polymerizable ethylenic unsaturated double bonds are more preferable.

The urethane oligomer preferably has a weight average molecular weight of from 5,000 to 13,000, more preferably from 10,000 to 13,000. When the weight average molecular weight is 5,000 or more, good stretchability is provided. When the weight average molecular weight is 13,000 or less, the viscosity becomes more suitable for inkjet inks.

The content rate of the polyfunctional reactive compound having at least two polymerizable ethylenic unsaturated double bonds in the polymerizable compound is preferably from 5% to 40% by mass, more preferably from 5% to 15% by mass. When the content rate is 5% by mass or more, suitable strength is provided. When the content rate is 40% by mass or less, suitable stretchability is provided.

Photopolymerization Initiator

The active energy ray curable composition according to an embodiment of the present invention may include a photopolymerization initiator. Specific examples of the photopolymerization initiator include, but are not limited to, acrylate compounds, methacrylate compounds, acrylamide compounds, methacrylamide compounds, and vinyl ether compounds, all of which are photocationic polymerization initiators. It is to be noted that photocationic polymerization initiators are generally expensive. In addition, photocationic polymerization initiators need special care since they slightly generate a strong acid even when not being exposed to light. Therefore, in a case in which a photocationic polymerization initiator is used for an ink, an ink supply path for passing the ink in an inkjet apparatus is preferably given acid resistance. In this case, a restriction is caused in selection of structural members of the inkjet apparatus. On the other hand, the active energy ray curable inkjet ink according to an embodiment of the present invention can include a cheap photopolymerization initiator which generates no strong acid. This makes it possible to produce inks at low costs and to select structural members of the inkjet apparatus without difficulty. Of course, when a high-energy light source that emits electron beam, $\alpha$-ray, $\beta$-ray, $\gamma$-ray, or X-ray is used, the polymerizable compound can undergo a polymerization reaction without the presence of a polymerization initiator.

Examples of the photopolymerization initiator include, but are not limited to, molecular cleavage photopolymerization initiators and hydrogen atom abstraction photopolymerization initiators.

Specific examples of the molecular cleavage photopolymerization initiators include, but are not limited to, 2,2-dimethoxy-1,2-diphenylethane-1-one, 1-hydroxycyclohexyl phenyl ketone, 2-hydroxy-2-methyl-1-phenylpropane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)benzyl]phenyl}-2-methyl-1-propane-1-one, oligo [2-hydroxy-2-methyl-1-[4-(1-methylvinyl)phenyl] propanone, phenylglyoxylic acid methyl ester, 2-methyl-1-[4-(methylthio)phenyl]-2-morpholinopropane-1-one, 2-benzyl-2-dimethylamino-1-(4-morpholinophenyl)butanone-1,2-dimethylamino-2-(4-methylbenzyl)-1-(4-morpholine-4-yl-phenyl)butane-1-one, bis(2,4,6-trimethylbenzoyl)phenylphosphine oxide, bis(2,6-dimethoxybenzoyl)-2,4,4-trimethyl-pentylphosphine oxide, 2,4,6-trimethylbenzoylphosphine oxide, 1,2-octanedione-[4-(phenylthio)-2-(o-benzoyloxime)], ethanone-1-[9-ethyl-6-(2-methylbenzoyl)-9H-carbazole-3-yl]-1-(O-acetyloxime), [4-(methylphenylthio)phenyl]phenylmethanone, and oligo [2-hydroxy-2-methyl-1-[4-(1-methylvinyl)phenyl]propane. Each of these compounds can be used alone or in combination with others.

Specific examples of hydrogen atom abstraction photopolymerization initiators include, but are not limited to: benzophenone compounds, such as benzophenone, methyl-benzophenone, methyl-2-benzoyl benzoate, 4-benzoyl-4'-methyl diphenyl sulfide, and phenylbenzophenone; and thioxanthone compounds such as 2,4-diethylthioxanthone, 2-chlorothioxanthone, isopropylthioxanthone, and 1-chloro-4-propylthioxanthone. Each type of these recording media can be used alone or in combination with others.

The content rate of the polymerization initiator to the total amount of the polymerizable compounds is preferably in the range of from 1% to 20% by mass, more preferably from 5% to 10% by mass.

Polymerization Accelerator

An amine compound can be used as a polymerization accelerator in combination with the photopolymerization initiator.

Specific examples of the amine compound include, but are not limited to, ethyl p-dimethylaminobenzoate, 2-ethylhexyl p-dimethylaminobenzoate, methyl p-dimethylaminobenzoate, 2-dimethylaminoethyl benzoate, and butoxyethyl p-dimethylaminobenzoate.

Other Components

The active energy ray curable composition according to an embodiment of present invention may include other components. Examples of such components include a colorant, a polymerization inhibitor, a surfactant, a photosensitizer, and a polar-group-containing polymeric pigment dispersant.

Colorant

Usable colorants include any known dyes and pigments. Usable pigments include both inorganic pigments and organic pigments. Various types of inorganic and organic pigments can be used in view of physical properties of the ink.

Specific examples of usable black pigments include, but are not limited to, carbon blacks which are produced by furnace methods or channel methods.

Specific examples of usable yellow pigments include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, and C.I. Pigment Yellow 180.

Specific examples of usable magenta pigments include, but are not limited to, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Specific examples of usable cyan pigments include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 16, C.I. Pigment Blue 22, C.I. Pigment Blue 60, C.I. Vat Blue 4, and C.I. Vat Blue 60.

Specific examples of usable white pigments include, but are not limited to, alkaline-earth metal sulfates (e.g., barium sulfate), alkaline-earth metal carbonates (e.g., calcium carbonate), fine powders of silicic acid, silicas (e.g., synthetic silicate), calcium silicates, aluminas, alumina hydrates, titanium oxides, zinc oxides, talc, and clay.

Polymerization Inhibitor

Specific examples of the polymerization inhibitor include, but are not limited to, 4-methoxy-1-naphthol, methyl hydroquinone, hydroquinone, t-butyl hydroquinone, di-t-butyl hydroquinone, methoquinone, 2,2'-dihydroxy-3,3'-di(α-methylcyclohexyl)-5,5'-dimethyldiphenylmethane, p-benzoquinone, di-t-butyl diphenyl amine, 9,10-di-n-butoxyanthracene, and 4,4'-[1,10-dioxo-1,10-decanediylbis(oxy)]bis[2,2,6,6-tetramethyl]-1-piperidinyloxy.

Specific examples of the surfactant include, but are not limited to, higher-fatty-acid-based surfactants, silicone-based surfactants, and fluorine-based surfactants.

Preferably, the inkjet ink according to an embodiment of the present invention is solventless.

To be solventless refers to a state in which any known solvent, such as ether, ketone, aromatic solvents, xylene, ethyl ethoxypropionate, ethyl acetate, cyclohexanone, diethylene glycol monomethyl ether, diethylene glycol monoethyl ether, γ-butyl lactone, ethyl lactate, cyclohexane methyl ethyl ketone, toluene, ethyl ethoxypropionate, propylene glycol monomethyl ether acetate, ethylene glycol monomethyl ether, diethylene glycol, and triethylene glycol monobutyl ether, is not included.

When the inkjet ink is solventless, the ink film includes no residual volatile organic solvent. This improves safety at printing sites and prevents environment pollution. In addition, the ink is not likely to dry at heads, thus making the printer maintenance much easier.

Composition Storage Container

The composition storage container according to an embodiment of the present invention includes a container and the above-described active energy ray curable composition contained in the container. In a case in which the composition is used for an ink, when a user is replacing the ink contained in the container, the user needs not directly contact the ink, thus preventing the user's fingers and clothes from being contaminated with the ink. In addition, the ink is prevented from being contaminated by foreign substances. Specific examples of the composition storage container include, but are not limited to, an ink cartridge and an ink tank.

The container is not limited in shape, structure, size, and material. Examples of the container include, but are not limited to, a bag which may be formed of an aluminum laminate film or a resin film.

Figure 2:
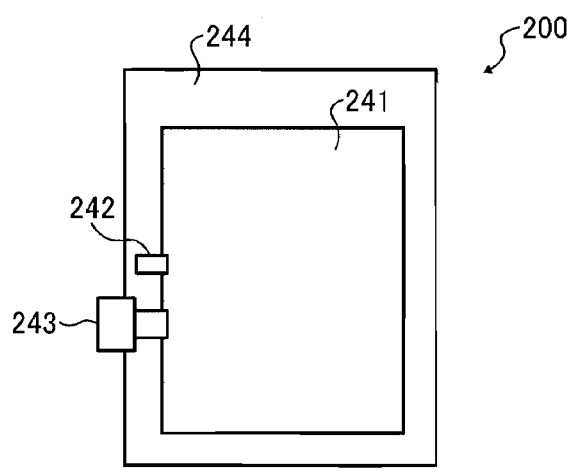
FIG. 2 is a schematic view of an ink cartridge according to an embodiment of the present invention, including the ink bag illustrated in FIG. 1.

Examples of the composition storage container include an ink cartridge. The ink cartridge is described in detail below with reference to FIGS. 1 and 2. FIG. 1 is a schematic view of an ink bag 241. FIG. 2 is a schematic view of an ink cartridge 200 including a cartridge casing 244 storing the ink bag 241.

Referring to FIG. 1, the ink bag 241 is filled with an ink through an ink inlet 242. After the air remaining in the ink bag 241 is discharged, the ink inlet 242 is sealed by fusion. When the ink bag 241 is put into use, an ink outlet 243, made of a rubber material, is pricked with a needle of an apparatus body, so that the ink can be supplied to the apparatus body. The ink bag 241 may be formed of a wrapping material having no air permeability, such as an aluminum laminate film. Referring to FIG. 2, the ink bag 241 is stored in the cartridge casing 244, which may be made of a plastic material, thus providing the ink cartridge 200. The ink cartridge 200 can be detachably attachable to an inkjet discharge apparatus.

The ink cartridge 200 is preferably detachably attached to an inkjet discharge apparatus. In this case, ink supply and ink replacement procedures can be simplified, thus improving workability.

Apparatus for Producing Cured Product

The apparatus for producing a cured product according to an embodiment of the present invention includes a discharger to discharge the active energy ray curable composition according to an embodiment of the present invention, and a hardener to emit an active energy ray to the active energy ray curable composition to cause the active energy ray curable composition to cure. In a case in which the apparatus for producing a cured product is an inkjet discharge apparatus, the apparatus includes at least a container to contain an ink including the active energy ray curable composition according to an embodiment of the present invention, an ink discharger, and a hardener.

Ink Discharger

The ink discharger discharges the ink including the active energy ray curable composition to a surface of a substrate by means of inkjet recording.

The ink discharger may be of a continuous injection type or an on-demand type, but is not limited thereto.

The on-demand type discharger may be of a piezo type, a thermal type, or an electrostatic type, but is not limited thereto.

Substrate

Specific examples of the substrate for use in the method and apparatus for producing a cured product include, but are not limited to, paper, plastic, metals, ceramics, glass, and composite materials thereof.

Among these materials, non-permeable substrates are preferable since the active energy ray curable composition according to an embodiment of the present invention is immediately curable upon light emission. In particular, plastic films and plastic moldings are preferable, which may be made of polyethylene, polypropylene, polyethylene terephthalate, polycarbonate, ABS (acrylonitrile butadiene styrene) resin, polyvinyl chloride, polystyrene, polyester, polyamide, vinyl materials, and composite materials thereof.

When polycarbonate or ABS resin is used for the substrate, the active energy ray curable composition preferably includes tetrahydrofurfuryl acrylate, tetrahydrofurfuryl methacrylate, cyclohexyl acrylate, cyclohexyl methacrylate, benzyl acrylate, benzyl methacrylate, acryloyl morpholine, and/or methacryloyl morpholine, since they have a high capability of dissolving polycarbonate and ABS resin. When acrylic resin is used for the substrate, the active energy ray curable composition preferably includes dimethylaminopropyl acrylamide since it has a high capability of dissolving acrylic resin.

Hardener

The hardener emits an active energy ray to the ink discharged to the surface of the substrate to cause the ink to cure.

Specific examples of the hardener include, but are not limited to, an ultraviolet emitter.

The inkjet discharge apparatus may further include other devices, such as a conveyer and a controller.

Figure 3:
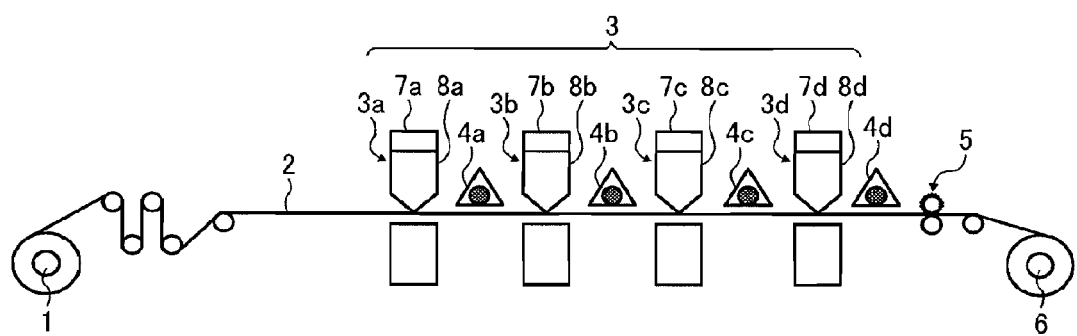
FIG. 3 is a schematic view of an inkjet discharge apparatus according to an embodiment of the present invention.

FIG. 3 is a schematic view illustrating an inkjet discharge apparatus, serving as the apparatus for producing a cured product according to an embodiment of the present invention. In FIG. 3, peripheral units of the inkjet discharge apparatus, having a printing mechanism, are also illustrated.

Referring to FIG. 3, four printing units 3a, 3b, 3c, and 3d (hereinafter collectively referred to as "printing units 3") for printing yellow, magenta, cyan, and black images, respectively, include respective containers 7a, 7b, 7c, and 7d to contain an inkjet ink including the active energy ray curable composition, and respective dischargers 8a, 8b, 8c, and 8d to discharge the inkjet ink to a substrate serving as a recording medium, by means of inkjet recording. Each of the printing units 3 discharges respective ink to a printing substrate 2, serving as the recording medium, supplied from a printing substrate supply roll 1 from the left side to the right side in FIG. 3. Each ink is generally discharged one by one when an image of the corresponding color is to be printed. Light sources 4a, 4b, 4c, and 4d (e.g., ultraviolet light sources), each serving as the hardener, then emit active energy rays (e.g., ultraviolet rays) to the respective ink on the printing substrate 2 to cause the inks to cure and form color images. The printing substrate 2 is then conveyed to a print winding roller 6 via a processing unit 5.

Each of the printing units 3a, 3b, 3c, and 3d may be equipped with a heating mechanism for liquefying the ink at the inkjet discharger.

In a case in which a firstly-formed image has a large area or is conveyed at a high speed, the substrate may cause a temperature rise. Therefore, a cooling mechanism for cooling the substrate to around room temperature, with or without contacting the substrate, may be provided at a position where the substrate is retained (e.g., an upper side or a lower side of the printing substrate 2 in FIG. 3).

The printing substrate 2 may be made of paper, a film, a metal, or a composite material thereof. The printing substrate 2 may be in the form of either a roll, as illustrated in FIG. 3, or a sheet. The printing substrate 2 may be applicable to either one-side printing or duplex printing.

Cured Product

The cured product according to an embodiment of the present invention is obtained by causing the active energy ray curable composition to cure. For example, the cured product can be obtained by emitting ultraviolet ray to an image formed on a substrate with the inkjet discharge apparatus according to an embodiment of the present invention, to cause the film of the image on the substrate rapidly cure to become a cured product.

Processed Product

The processed product according to an embodiment of the present invention is obtained by processing the cured product obtained by causing the active energy ray curable composition to cure.

The processed product is preferably used for meters and operation panels of automobiles, office automation equipments, electric or electronic devices, and cameras.

Use Application

The active energy ray curable composition can be applied to, for example, modeling resins, paints, adhesives, insulating materials, release agents, coating materials, sealing materials, resists, and optical materials.

The active energy ray curable composition according to an embodiment of the present invention can be used for either inks for forming two-dimensional texts and images, or stereoscopic modeling materials for forming three-dimensional images (i.e., stereoscopic modeled objects). The stereoscopic modeling material can be applied to additive manufacturing, material jetting, and optical modeling, each of which is one of stereoscopic modeling processes. In additive manufacturing, the stereoscopic modeling material is used as a binder of powder particles. In material jetting, the stereoscopic modeling material is discharged to a certain region and exposed to an active energy ray to cure, and the cured layers are sequentially laminated to form a stereoscopic object. In optical modeling, the stereoscopic modeling material is retained in a pool and exposed to an active energy ray to be formed into a cured layer, and the cured layers are sequentially laminated to form a stereoscopic object. Stereoscopic modeling apparatuses for forming stereoscopic modeled objects with the active energy ray curable composition are not limited in structure and may include a discharger for discharging the composition and an active energy ray emitter.

The active energy ray curable composition according to an embodiment of the present invention is not limited in viscosity. The viscosity is adjusted in accordance with the use application of the active energy ray curable composition. When the active energy ray curable composition is applied to a discharger configured to discharge the active energy ray curable composition from nozzles, the viscosity is preferably adjusted to from 3 to 40 mPa·s, more preferably from 5 to 15 mPa·s, most preferably from 6 to 12 mPa·s, within a temperature range of from 20° C. to 65° C., more preferably at a temperature of 25° C. In particular, the preferable viscosity range is achieved without including any organic solvent in the active energy ray curable composition. The viscosity can be measured with a cone-plate rotational viscometer Model TVE-22L (available from TOKI SANGYO CO., LTD) equipped with a cone rotor (1°34'× R24), while setting the rotation number to 50 rpm and the temperature of constant-temperature circulating water to 20° C. to 65° C. The temperature of constant-temperature circulating water is controlled by an instrument VISCOMATE VM-150III.

EXAMPLES

Having generally described this invention, further understanding can be obtained by reference to certain specific examples which are provided herein for the purpose of illustration only and are not intended to be limiting.

Examples 1-7 and Comparative Examples 1-3

Preparation of Active Energy Ray Curable Inkjet Inks

In each Examples and Comparative Examples, raw materials described in Table 1 or Table 2 were added to a vessel one by one while being stirred. After one hour of stirring, it was confirmed that no raw material was existing without being dissolved. The resulting mixture was filtered with a membrane filter so that coarse particles, which would clog inkjet heads, were removed. Thus, active energy ray curable inkjet inks of Examples 1-7 and Comparative Examples 1-3 were prepared. In Tables 1 and 2, numerical values for photopolymerizable compounds, colorants, and polymerization initiators represent mass ratios in parts.

Cured products of the above-prepared active energy ray curable inkjet inks were prepared as follows.
Preparation of Cured Products
Each active energy ray curable inkjet ink was discharged with an inkjet discharge apparatus equipped with GEN4 head (product of Ricoh Printing Systems, Ltd.) on a polycarbonate substrate (Iupilon® 100FE2000 Masking, having a thickness of 100 μm, available from Mitsubishi Engineering-Plastics Corporation), to become a film having an average thickness of 10 μm. Immediately after being discharged, the ink film was irradiated with ultraviolet ray having a light quantity of 1,500 mJ/cm$^2$, emitted from an emitter LH6 available from Fusion Systems Japan, to become a cured product.

The above-prepared cured products were subjected to evaluations of their stretchability, glass transition temperature, storage elastic modulus, and strength in the following manner. Evaluation results were shown in Tables 1 and 2.
Evaluations
Stretchability
A three-layer cured product of each active energy ray curable inkjet ink was obtained by: forming a first film of the ink having an average thickness of 10 μm on a polycarbonate substrate having a thickness of 100 μm and irradiating the first film with an active energy ray having a light quantity of 1,500 mJ/cm$^2$; forming a second film of the ink having an average thickness of 10 μm on the first film and irradiating the second film with an active energy ray having a light quantity of 1,500 mJ/cm$^2$; and forming a third film of the ink having an average thickness of 10 μm on the second film and irradiating the third film with an active energy ray having a light quantity of 1,500 mJ/cm$^2$. The three-layer cured product thus prepared was subjected to a tensile test in which the cured product was stretched along with the substrate with a tensile tester at a stretching speed of 20 mm/min and a temperature of 180° C. The stretchability was evaluated by a ratio L2/L1, wherein L1 represents a first length of the cured product before a tensile test and L2 represents a second length of the cured product after the tensile test.

The polycarbonate substrate was a polycarbonate (PC) film (Iupilon® 100FE2000 Masking, having a thickness of 100 μm, available from Mitsubishi Engineering-Plastics Corporation).
Glass Transition Temperature and Storage Elastic Modulus
To measure the glass transition temperature and storage elastic modulus, the cured product on the polycarbonate substrate was cut into a piece having a width of 10 mm and a length of 40 mm, gently peeled off, and subjected to a measurement with a dynamic viscoelasticity measuring instrument DMS6100 (available from Seiko Instruments Inc.) while setting the distance between chucks to 20 mm, the measurement frequency to 1 Hz, the measurement temperature range to from 30° C. to 130° C., and the temperature rising rate to 1° C./min.

The glass transition temperature (Tg) was determined from a peak top temperature with respect to tan δ in the resulting profile. The storage elastic modulus (E') at 90° C. was read from the profile.
Strength
Each cured product was left in a thermostatic chamber at a temperature of 60° C. for one day while putting a strength testing jig and a weight on the cured product. The pressure from the weight to the cured product (i.e., the ratio of the weight to the contact area between the jig and the cured product) was 1 MPa. After the jig and weight were removed, the surface of the cured product was visually observed to determine whether a dent had been made by the jig/weight or not. The strength was evaluated based on the following criteria.
  A: No dent was made by the weight.
  B: Slight dent was made by the weight.
  C: A dent was made by the weight, but the dent had not reached the substrate.
  D: A dent made by the weight had reached the substrate.
  Details of the materials used in Examples and Comparative Examples are descried below.
Photopolymerizable Compounds
Dicyclopentenyl acrylate: FA-511AS available from Hitachi Chemical Company, Ltd., the homopolymer of which having a glass transition temperature of 120° C.

Isobornyl acrylate, the homopolymer of which having a glass transition temperature of 97° C., available from SARTOMER.
Benzyl acrylate, the homopolymer of which having a glass transition temperature of 6° C., available from Osaka Organic Chemical Industry Ltd.
Isooctyl acrylate: IOAA available from Osaka Organic Chemical Industry Ltd., the homopolymer of which having a glass transition temperature of −58° C.
Hydroxyethyl acrylate: HEA available from Osaka Organic Chemical Industry Ltd., the homopolymer of which having a glass transition temperature of −15° C.
1,6-Hexanediol diacrylate: A-HD-N available from Shin Nakamura Chemical Co., Ltd.
Polyester-based urethane acrylate: UV-3000B available from The Nippon Synthetic Chemical Industry Co., Ltd.
Carbon Black
A mixture of 3 parts by mass of a carbon black (MITSUBISHI® Carbon Black #10 available from Mitsubishi Chemical Corporation) and 1 part by mass of a polymer disperser (S32000 available from The Lubrizol Corporation).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. An active energy ray curable composition, comprising a polymerizable compound comprising a polyfunctional reactive compound having at least two polymerizable ethylenic unsaturated double bonds and a combination of at least two monofunctional reactive compounds having one polymerizable ethylenic unsaturated double bond, including a high-Tg monofunctional reactive compound and a low-Tg monofunctional reactive compound,
wherein:

TABLE 1

| | | Compound Name | Glass Transition Temp. (° C.) | Example 1 | Example 2 | Example 3 | Example 4 | Example 5 |
|---|---|---|---|---|---|---|---|---|
| Photopolymerizable Compounds | Monofunctional Reactive Compounds | Dicyclopentenyl Acrylate | 120 | | 90 | | 60 | 70 |
| | | Isoborayl Acrylate | 97 | | | 50 | | |
| | | Isooctyl Acrylate | −58 | 80 | | 40 | 15 | |
| | | Benzyl Acrylate | 6 | | | | | 15 |
| | | Hydroxyethyl Acrylate | −15 | | | | | |
| | Difunctional Reactive Compounds | 1,6-Hexanediol Diacrylate | | 5 | | | 10 | 5 |
| | | Polyester-based Urethane Acrylate: UV-3000B | | 15 | 10 | 10 | 15 | 10 |
| Colorant | Carbon Black | | | 5 | 5 | 5 | 5 | 5 |
| Stretchability | | | | 2.2 | 2.5 | 2.3 | 2.5 | 2.5 |
| Glass Transition Temp. (° C.) of Cured Product | | | | 51 | 88 | 57 | 115 | 120 |
| Storage Elastic Modulus (MPa) of Cured Product | | | | 0.45 | 0.89 | 1.03 | 8.7 | 9.1 |
| Strength | | | | B | A | A | A | A |

TABLE 2

| | | Compound Name | Glass Transition Temp. (° C.) | Example 6 | Example 7 | Comparative Example 1 | Comparative Example 2 | Comparative Example 3 |
|---|---|---|---|---|---|---|---|---|
| Photopolymerizable Compounds | Monofunctional Reactive Compounds | Dicyclopentenyl Acrylate | 120 | 95 | 80 | | 30 | 45 |
| | | Isobornyl Acrylate | 97 | | | | 5 | 41 |
| | | Isooctyl Acrylate | −58 | | | 59 | | |
| | | Benzyl Acrylate | 6 | | | | | |
| | | Hydroxyethyl Acrylate | −15 | | | | | |
| | Difunctional Reactive Compounds | 1,6-Hexanediol Diacrylate | | 5 | 5 | | 65 | 4 |
| | | Polyester-based Urethane Acrylate: UV-3000B | | | 15 | 41 | | |
| Colorant | Carbon Black | | | 5 | | 5 | | |
| Stretchability | | | | 2.8 | 2 | 1.1 | 1 | 2.5 |
| Glass Transition Temp. (° C.) of Cured Product | | | | 125 | 118 | 44 | 104 | 38 |
| Storage Elastic Modulus (MPa) of Cured Product | | | | 9.9 | 9.1 | 14.2 | 10.3 | 1.3 |
| Strength | | | | A | A | C | B | D | a homopolymer of the high-Tg monofunctional reactive compound has a glass transition temperature of 90° C. or more, and a homopolymer of the low-Tg monofunctional reactive compound has a glass transition temperature of less than 90° C.;

the high-Tg monofunctional reactive compound accounts for 60% by mass or more of the total mass of monofunctional reactive compounds; and when a three-layer cured product of the active energy ray composition is obtained by:

forming a first film of the active energy ray curable composition having an average thickness of 10 μm on a polycarbonate substrate having a thickness of 100 μm and irradiating the first film with an active energy ray having a light quantity of 1,500 mJ/cm$^2$;

forming a second film of the active energy ray curable composition having an average thickness of 10 μm on the first film and irradiating the second film with an active energy ray having a light quantity of 1,500 mJ/cm$^2$; and forming a third film of the active energy ray curable composition having an average thickness of 10 μm on the second film and irradiating the third film with an active energy ray having a light quantity of 1,500 mJ/cm$^2$, the three-layer cured product has:

(1) a stretchability of 1.1 or more, the stretchability being defined by a ratio L2/L1;

(2) a glass transition temperature of 50° C. or more, wherein:

L1 represents a first length of the cured product before a tensile test;

L2 represents a second length of the cured product after the tensile test: and the tensile test includes stretching the cured product along with the substrate with a tensile tester at a stretching speed of 20 min/min and a temperature of 180° C.

2. The active energy ray curable composition of claim 1, wherein the cured product has a storage elastic modulus of from 0.85 to 10 MPa at 90° C.

3. The active energy ray curable composition of claim 1, wherein the cured product has a glass transition temperature of 100° C. or more.

4. The active energy ray curable composition of claim 1, wherein a homopolymer of the high-Tg monofunctional reactive compound has a glass transition temperature of 97° C. or more.

5. The active energy ray curable composition of claim 1, wherein the high-Tg monofunctional reactive compound accounts for more than 60% by mass of the total monofunctional reactive compounds.

6. The active energy ray curable composition of claim 1, wherein the a polyfunctional reactive compound has a functional group number of from 2 to 5.

7. The active energy ray curable composition of claim 6, wherein the polyfunctional reactive compound having at least two polymerizable ethylenic unsaturated double bonds accounts for 5% to 40% by mass of the polymerizable compound.

8. An ink, comprising the active energy ray curable composition of claim 1.

9. An inkjet ink, comprising the ink of claim 8.

10. A method for producing a cured product, the method comprising:

discharging the active energy ray curable composition of claim 1 to a surface of a substrate by inkjet recording; and emitting an active energy ray to the active energy ray curable composition on the surface of the substrate to cause the active energy ray curable composition to cure.

11. An apparatus for producing a cured product, the apparatus comprising:

a container to contain the active energy ray curable composition of claim 1;

a discharger to discharge the active energy ray curable composition to a surface of a substrate by inkjet recording; and a hardener to emit an active energy ray to the active energy ray curable composition on the surface of the substrate to cause the active energy ray curable composition to cure.

12. A composition storage container, comprising:

a container; and the active energy ray curable composition of claim 1 contained in the container.

13. A cured product, produced by a method comprising curing the active energy ray curable composition of claim 1.

14. A processed product, produced by a method comprising stretching-processing the cured product of claim 13.

* * * * *